Oct. 23, 1973 K. H. SWEENY ET AL 3,767,782
SELF-DESTRUCTING PESTICIDAL FORMULATIONS
AND METHODS FOR THEIR USE
Filed Dec. 23, 1970
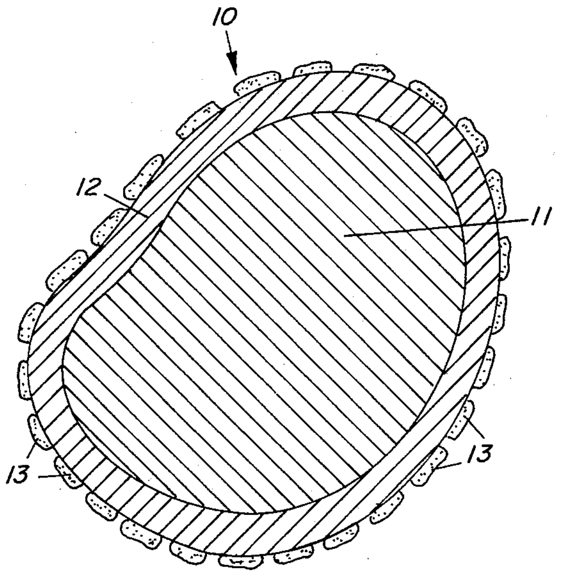
INVENTORS
KEITH H. SWEENY
JAMES R. FISCHER
Ernest S. Cohen
BY Roland H. Shubert
ATTORNEYS 3,767,782

SELF-DESTRUCTING PESTICIDAL FORMULATIONS AND METHODS FOR THEIR USE

Keith H. Sweeny, West Covina, and James R. Fischer, Claremont, Calif., assignors to the United States of America as represented by the Secretary of the Interior Filed Dec. 23, 1970, Ser. No. 100,984
Int. Cl. A61k *9/00*
U.S. Cl. 424—2 8 Claims

ABSTRACT OF THE DISCLOSURE

Normally persistent pesticides, such as DDT, are formulated as small particles having a reactive metal or metallic-couple central core, an intermediate layer of elemental sulfur and an exterior coating of pesticide. The sulfur layer temporarily isolates the metallic core from the pesticide but after exposure to a field environment reacts with oxygen and water to provide a localized acidic environment for the reaction of pesticide with metal.

BACKGROUND OF THE INVENTION

A number of extremely useful useful pesticides also possess great stability and show little degradation when exposed to ordinary environmental conditions. Hence they persist in soil and water for long periods of time; often for many years. Repeated use of such pesticides may even result in a continuing buildup of residual pesticide concentration in the environment.

Such environmental stability is a very desirable characteristic for some uses as in long term termite protection of buildings and other structures. That same characteristic is undesirable when the pesticide is used for the short term control or eradication of a particular organism. Typical of such useful but persistent pesticides are the halogenated organics exemplified by DDT, chlordane, toxaphene, dieldrin and the like.

It is now recognized that at least some of these pesticides are retained within the body of many organisms and higher animals resulting in progressively higher concentrations of pesticide as one progresses up the food chain. It has also been recognized that relatively high concentrations of pesticide will affect metabolic processes, particularly reproductive functioning, of some animals. For example, DDT has been linked to the so-called thin shell syndrome observed in a variety of birds.

In spite of their ecological hazards, no really satisfactory substitute is available for many of the halogenated hydrocarbons in a number of specific uses. Many of the undesirable side effects of halogenated organic pesticides would be alleviated if they were less stable and degraded to form innocuous products after a relatively short exposure to environmental conditions.

SUMMARY OF THE INVENTION

We have found that stable pesticide compounds, such as halogenated organics, may be formulated to obtain their substantially complete destruction within a relatively short time after field application. The formulation comprises an integrated, self-destructing pesticide particle having a reactive metal or metallic couple core coated with a layer of an acid-producing material comprising elemental sulfur. An external pesticide coating is applied in an adhering fashion to the sulfur layer.

Isolation of the pesticide from the reactive central core is temporarily maintained by the sulfur layer. After exposure to the oxygen and moisture of a normal field environment, the sulfur layer degrades to provide a localized acidic environment for the reaction of pesticide with the metal.

OBJECTS OF THE INVENTION

In spite of their ecological hazards, no really satisfactory self-destructing pesticide formulation.

Another object of our invention is to provide a method for the application of normally persistent pesticides to a field environment while avoiding residual accumulations of those materials.

Yet another object of our invention is to provide a process for the formulation of self-destructing pesticide particles.

DETAILED DESCRIPTION OF THE INVENTION

Our invention will be more clearly understood by reference to the accompanying drawing in which the figure represents a generalized cross-sectional view of a self-destructing pesticide particle.

Referring now to the figure, an individual particle of our pesticide formulation is generally represented by the numeral 10. The particle comprises a central core 11 of a reactant material which is preferably a metal or metallic couple capable of either reducing or polymerizing the pesticide to biologically inactive forms. Coated on core 11 is a relatively thin, continuous layer of an acid producing material comprising elemental sulfur. Adhering to sulfur layer 12, preferably in a particulate or discontinuous fashion, is a pesticidal composition 13.

Size of the composite particles is preferably within the range of conventional pesticidal particles adapted for application by air dispersion. Diameter of individual particles should be within the general range of about 1 to about 100 microns. The optimal and preferred particle size to achieve highly efficient pest control action and uniformity of application ranges from about 5 to about 20 microns.

In co-pending, commonly assigned patent applications Ser. Nos. 100,975 and 101,201, now U.S. Pat. No. 3,640,821, there is disclosed the reaction of DDT and other chlorinated organic compounds with metallic zinc and a variety of metallic couples in a mildly acidic environment to produce relatively innocuous degradation products. Any of the metal reactants disclosed in those applications are contemplated for use as the reactive central core material 11. These metal reactants include metallic zinc and metallic couples comprising a minor amount of a catalytic metal, such as copper or silver, combined with a major amount of a reductant metal such as zinc, aluminum, iron, cadmium and magnesium. Examples of metallic couples useful in our invention include zinc-copper, zinc-silver, aluminum-copper, magnesium-copper and cadmium-copper. Of these metallic reductants, the following are preferred: metallic zinc, zinc-copper, aluminum-copper and iron-copper.

It is preferred that the metallic reductant be present in stoichiometric excess relative to the pesticide. In the degradative reaction of metallic zinc or zinc couples with p,p'-DDT, for example, the reaction proceeds via a chlorine removal in a step-wise fashion to form relatively nontoxic products. The major end product of this reaction is 1,1-bis(p-chlorophenyl)ethane which is also referred to as DDEt. This reaction may be diagrammed as follows:

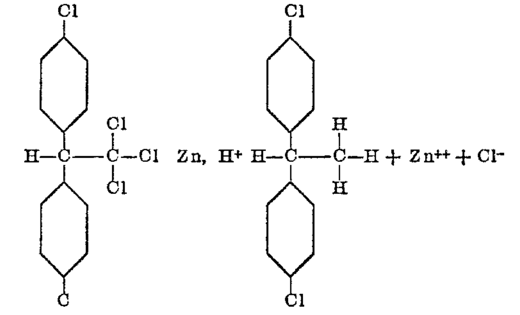

p,p'-DDT p,p'-DDEt

Stoichiometric considerations require equivalents of metallic reductant per mol of DDT. Thus, on a weight basis, 0.28 lb. of zinc is required to reduce 1 lb. of DDT. However, it is preferred that zinc be provided in about 2 to about 10 times the stoichiometric requirements. An equal weight of zinc and DDT, representing a stoichiometric excess of about 4 fold, has given good results.

When using aluminum-copper or iron-copper couples, there occurs a different type of reaction with DDT. In these cases, the DDT is essentially dimerized to form a compound which has been identified as 1,1,4,4-tetra(p-chlorophenyl)-2,2,3,3-tetrachlorobutane which is also referred to as TTTB. The reaction is diagrammed as follows:

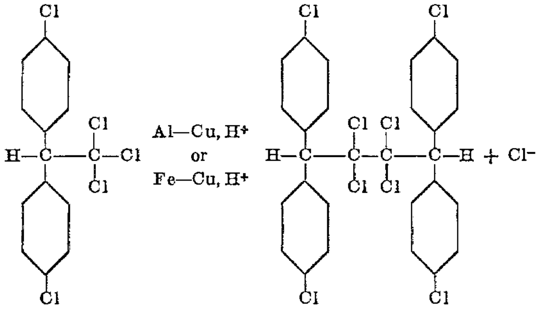

p,p'-DDT TTTB

The product compound, TTTB, is lipoid insoluble and appears to exhibit little if any physiological activity. Only one equivalent of metallic reductant is required per mol of DDT in this reaction. Hence, only 0.025 lb. of aluminum or 0.052 lb. of iron is theoretically required per mol of DDT. Again, it is preferred that the metal be present in an amount about 2 to 10 times that theoretically required.

Other halogenated organic compounds including the pesticides toxaphene, lindane, methoxychlor, dieldrin, Kelthane, chlordane, Perthane, endrin, aldrin and heptachlor and such compounds as polychlorinated polyphenyls also readily react with the metals or metallic couples disclosed under mildly acidic conditions to produce a series of degradation products. Kelthane is a trademark for an agricultural miticide based on 1,1-bis(para-chlorophenyl)-2,2,2-trichloroethanol while Perthane is a trademark for an agricultural insecticide based on 1,1-dichloro-2,2-bis(para-ethylphenyl)-ethane. Any of these pesticides, either singly or in admixture, are contemplated for use in our invention.

The metallic couples may be prepared in a variety of simple ways. For example, preparation of a metal-copper couple may be carried out be contacting a metal powder with a dilute solution of a copper salt such as the sulfate or chloride. A thin film of metallic copper is thus deposited over the surface of the metal particles. Generally, about 0.1 to about 10 milliequavalents of copper are used per gram of metal powder. Optimum results were achieved at a copper level of about 1 meq. per g.

of metal particles. Other methods of preparation such as by the hot reduction of a mixture of metal and cupric oxide, give substantially equivalent results.

Sulfur layer 12 may be applied using conventional coating techniques. Sulfur may be dissolved in a suitable solvent, such as carbon disulfide, and slurried with the metal particles. Heating then drives off the solvent leaving a coating of sulfur around each metal particle. Other conventional coating techniques, such as vapor deposition, fluidized bed coating processes and the like may also be employed.

The delay period desired between field application and decomposition of the pesticide may be adjusted in several ways. First, properties of the sulfur layer may be modified by the use of suitable plasticizers to change or improve the physical properties of the sulfur film. Plasticizers of the polysulfide type have been found especially useful for this purpose. Thickness of the sulfur layer may be varied over a fairly wide range to adjust the delay period prior to decomposition. In all cases, sulfur should form an essentially continuous layer around the metal core. On a weight basis, sulfur will generally comprise from about 5 to about 50% of the composite particle depending upon particle size and the delay period desired.

Exterior pesticide layer 13 is preferably applied in a adhering but discontinuous fashion to the sulfur layer. Again, conventional coating techniques may be used. The composite particles are then applied in the normal manner to crop lands or other areas of pest infestation. Upon exposure to the ordinary outdoor conditions of oxygen and moisture availability, the sulfur slowly reacts in the following manner:

$$S \xrightarrow{\text{air}} SO_2 \longrightarrow SO_3$$

$$+ H_2O \longrightarrow H_2SO_4 \qquad + H_2O \longrightarrow H_2SO_4$$

Thus, there is provided a localized source of acidity to promote the reaction as well as the breaking down of the physical barrier between the pesticide and reactant metal.

Field life of the pesticidal composition is to some extent dependent upon the weather conditions occurring after application. Adjustment of the average field life may be accomplished over a fairly wide time span merely by varying the thickness or properties of the sulfur layer.

We claim:

1. A composite, particulate, pesticidal composition comprising:

a halogenated, organic pesticide exterior layer adhered in discontinuous fashion to a sulfur layer over a metallic reductant core, said pesticide chosen from the group consisting of DDT, toxaphene, lindane, methoxychlor, dieldrin, Kelthane, chlordane, Perthane, endrin, aldrin and heptachlor;

a metallic reducant core chosen from the group consisting of metallic zinc and the metallic couples of zinc-copper, zinc-silver, aluminum-copper, iron-copper, magnesium-copper and cadmium-copper, and an acid producing material comprising elemental sulfur, said sulfur comprising 5 to 50% weight of the composite particle and arranged to form an essentially continuous layer around the metal core to physically isolate the pesticide from the reductant for a predetermined period of time after exposure of the composition to a field environment.

2. The composition of claim 1 wherein the reductant is chosen from the metallic couples of zinc-copper, iron-copper and aluminum-copper.

3. The composition of claim 2 wherein the metallic couple is present in 2 to 10 fold excess over that stoichiometrically required to completely react with the pesticide.

4. The composition of claim 3 wherein the acid producing material consists of elemental sulfur and a plasticizer.

5. The composition of claim 4 wherein the pesticide is DDT.

6. The composition of claim 5 wherein the mean diameter of the composite particles is in the range of about 5 to about 20 microns.

7. Aprocess for decreasing the residual concentration of a normally persistent pesticide which comprises
applying a pesticide chosen from the group consisting of DDT, toxaphene, lindane, methoxychlor, dieldrin, Kelthane, chlordane, Perthane, endrin, aldrin and heptachlor to a field environment as a formulation having self-destructing properties, said formulation comprising a particulate composite of the pesticide with a reactive material chosen from the group consisting of metallic zinc and the metallic couples of zinc-copper, zinc-silver, aluminum-copper, iron-copper, magnesium-copper and cadmium-copper;
maintaining temporary isolation of the pesticide from the reactive material after field application by the defined means of the composite pesticidal composition of claim 1 wherein a barrier comprising elemental sulfur is interposed between the pesticide and the reactive material, and
reacting the sulfur barrier with air and moisture normally present in a field environment thereby producing a localized acidic environment and allowing the pesticide to interact with the reactive material to produce environmentally innocuous degradation products.

8. The process of claim 7 wherein the pesticide is DDT, wherein the reactive material is chosen from the group consisting of the metallic couples of zinc-copper, aluminum-copper and iron-copper and wherein the metallic couple is present in amounts in excess of that required to stoichiometrically react with the DDT.

References Cited

UNITED STATES PATENTS

| | | | |
|---|---|---|---|
| 3,206,297 | 9/1965 | O'Connor | 71—28 |
| 2,069,710 | 2/1937 | Missbach | 424—162 X |
| 1,911,868 | 5/1933 | Young | 424—162 X |
| 2,165,206 | 7/1939 | Bacon et al. | 424—162 X |
| 2,414,193 | 1/1947 | Durham | 424—354 X |
| 2,786,012 | 3/1957 | McHan | 424—357 X |
| 2,547,261 | 4/1951 | Geiger et al. | 424—164 X |
| 2,491,632 | 12/1949 | Wieder | 424—164 |
| 2,414,216 | 1/1947 | Wean et al. | 424—354 X |
| 2,461,852 | 2/1949 | Stein et al. | 260—649 |
| 3,640,821 | 2/1972 | Sweeny et al. | 210—59 |

FOREIGN PATENTS

| | | |
|---|---|---|
| 1,945,108 | 3/1970 | Germany. |
| 571,484 | 8/1945 | Great Britain. |
| 1,300,133 | 7/1969 | Germany. |
| 624,136 | 5/1949 | Great Britain. |

OTHER REFERENCES

Fleck et al.: Ind. & Eng. Chem. 37 (4):403–405, April 1945 "Compatibility of DDT with Insecticides, Fungicides and Fertilizers."

Fleck et al.: J.A.C.S. 66:2095, December 1944, "Catalytic Removal of Hydrogen Chloride from Some Substituted α-Trichloroethanes."

Gunther et al.: Science 104:203–204, August 1946, "Inhibition of the Catalyzed Thermal Decomposition of DDT."

CA. 43, #199b, #3697d (1949), EA. 46, #6787h, #7274b (1952), C.A. 48, #315g (1954), C.A. 59, #9259h (1963): Birrel, "Thermal Decomposition of DDT by Some Soil Constituents."

SHEP K. ROSE, Primary Examiner

U.S. Cl. X.R.

424—10, 16, 132, 140, 145, 147, 164, 354